United States Patent [19]
Basse

[11] 3,810,015

[45] May 7, 1974

[54] SENSITIVE WIDE BAND VOLTMETERS

[75] Inventor: Philip Basse, Freeport, N.Y.

[73] Assignee: Comstron Corporation, Richmond Hill, N.Y.

[22] Filed: Apr. 12, 1972

[21] Appl. No.: 243,224

[52] U.S. Cl............................ 324/120, 324/115
[51] Int. Cl..................... G01r 19/26, G01r 15/08
[58] Field of Search........ 324/120, 99 D, 99 R, 115, 324/123 R, 123 C

[56] References Cited
UNITED STATES PATENTS

| | | | |
|---|---|---|---|
| 3,196,348 | 7/1965 | Parker | 324/120 |
| 3,201,781 | 8/1965 | Holland | 324/120 |
| 2,497,961 | 2/1950 | Shaw | 324/99 D |
| 3,383,594 | 5/1968 | Fiorletta et al. | 324/99 R |

Primary Examiner—Alfred E. Smith
Assistant Examiner—Ernest F. Karlsen
Attorney, Agent, or Firm—Arthur L. Plevy

[57] ABSTRACT

There is described a sensitive wide band voltmeter for measuring the amplitude of an AC signal. The voltmeter includes a mixing circuit having an input adapted to receive an AC signal. A sweep oscillator is capable of operating in a first mode for providing a relatively fast slope waveform and in a second mode responsive to the output of the mixer producing a frequency within a relatively narrow band. During the second mode the frequency difference signal from the mixer is detected and stored to provide an indication of the magnitude of the input AC signal.

A memory is utilized to provide a stable output indication. The memory is updated at the conclusion of each sweep cycle.

8 Claims, 6 Drawing Figures

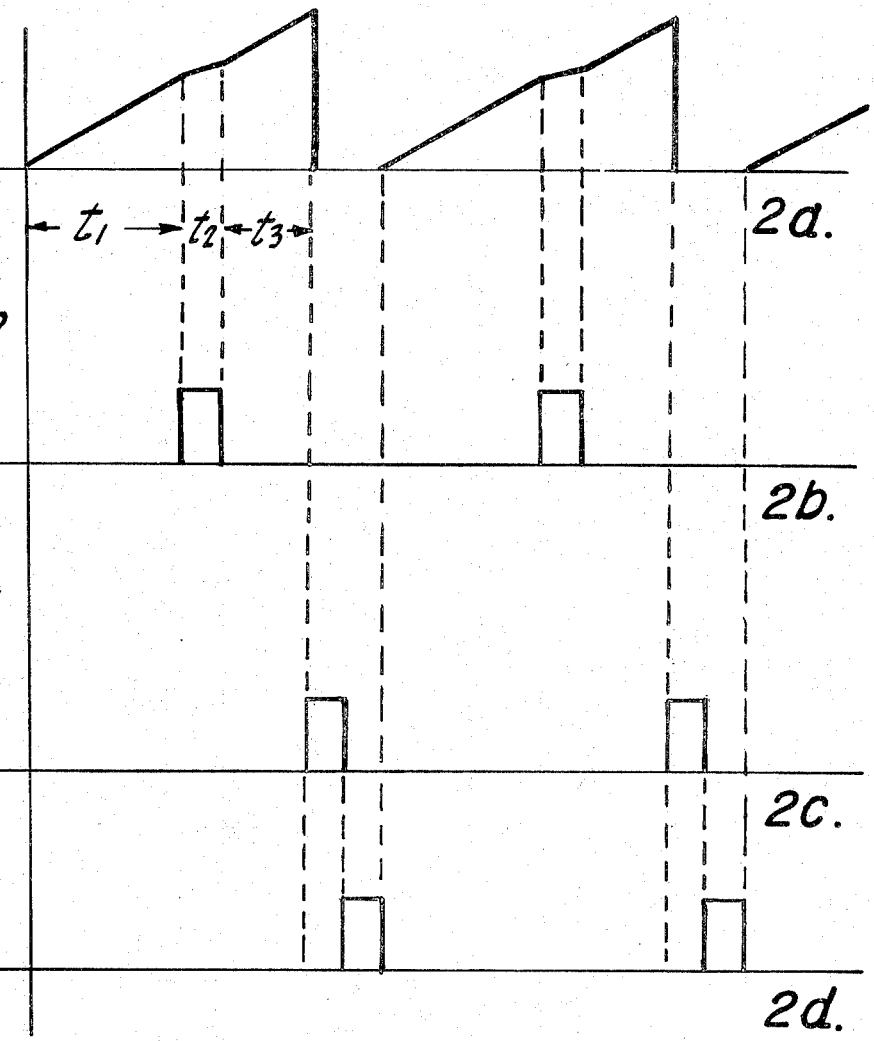

SENSITIVE WIDE BAND VOLTMETERS

This invention relates to signal amplitude measuring apparatus and more particularly to such apparatus useful for measuring signal amplitudes over a wide range of frequency.

BACKGROUND OF INVENTION

Presently there are a great number of instruments available which function to measure signal amplitude of an AC signal. These instruments are commonly referred to as voltmeters and are capable of operation over fairly wide frequency ranges. Depending upon the range of frequency accommodated, the voltmeter is further referenced as an audio or radio frequency type.

Most of these voltmeters are relatively conventional and utilize a detector arrangement, which provides a rectified current or DC output voltage. This current is then applied to a meter or other readout device to produce an indication proportional to the voltage applied to the input of the detector.

The types of voltmeters are also a function of the circuit configuration and can be referred to as diode or plate detection devices.

In any event the basic devices have been improved and now incorporate many additional desireable features such as automatic ranging, digital readouts and so on. However, present voltmeters omit many desireable operating features as the increase in technology has expanded faster than the voltmeter or measuring equipment art.

For example, most of these units are incapable of detecting high frequency, low amplitude signals with any reliability. In general, as the frequency of the input signal increases and as the amplitude decreases, the voltmeter's ability to respond decreases. Due to the new generation of sophisticated signal generators, receivers and other apparatus, it is desireable to perform accurate high frequency, low amplitude measurements.

It is therefore an object of this invention to provide an improved voltmeter apparatus capable of operating over a wide frequency range while providing accurate indications of signal amplitude.

BRIEF DESCRIPTION OF PREFERRED EMBODIMENT

Apparatus is provided for measuring the amplitude of an AC signal over a wide range of frequencies and capable of responding to low amplitude signals. The apparatus includes mixing circuit means having first and second input terminals, said first input terminal adapted to receive said AC signal to be measured; a variable oscillator, has a control input terminal adapted to receive a voltage to vary the frequency of said oscillator. An input terminal of the oscillator is coupled to the second input terminal of the mixing circuit to provide at the output of the mixing circuit a difference signal frequency; filter means coupled to the output of said mixing circuit are operative to pass a predetermined relatively narrow band of said difference frequencies, threshold means having an input terminal coupled to said filter means are responsive to said narrow band frequencies to provide a control voltage, the control voltage is applied to the oscillator control input terminal to decrease the rate at which the frequency of the oscillator is varied during the presence of said control voltage and indicator means responsive to the difference signal and coupled to the control means provides at an output a signal level indicative of said frequency difference signal during said decreased rate of said oscillator.

Further embodiments include apparatus for measuring the amplitude of an AC signal including a peak memory circuit which is coupled to said filter means and responsive to said difference signal to store a voltage during the presence of an output from said filter means, indicative of the amplitude of said AC signal.

BRIEF DESCRIPTION OF FIGURES

FIGS. 2A to 2D are a series of timing wave shapes useful in explaining the operation of the configuration shown in FIG. 1.

DETAILED DESCRIPTION OF FIGURES

Figure 1A:
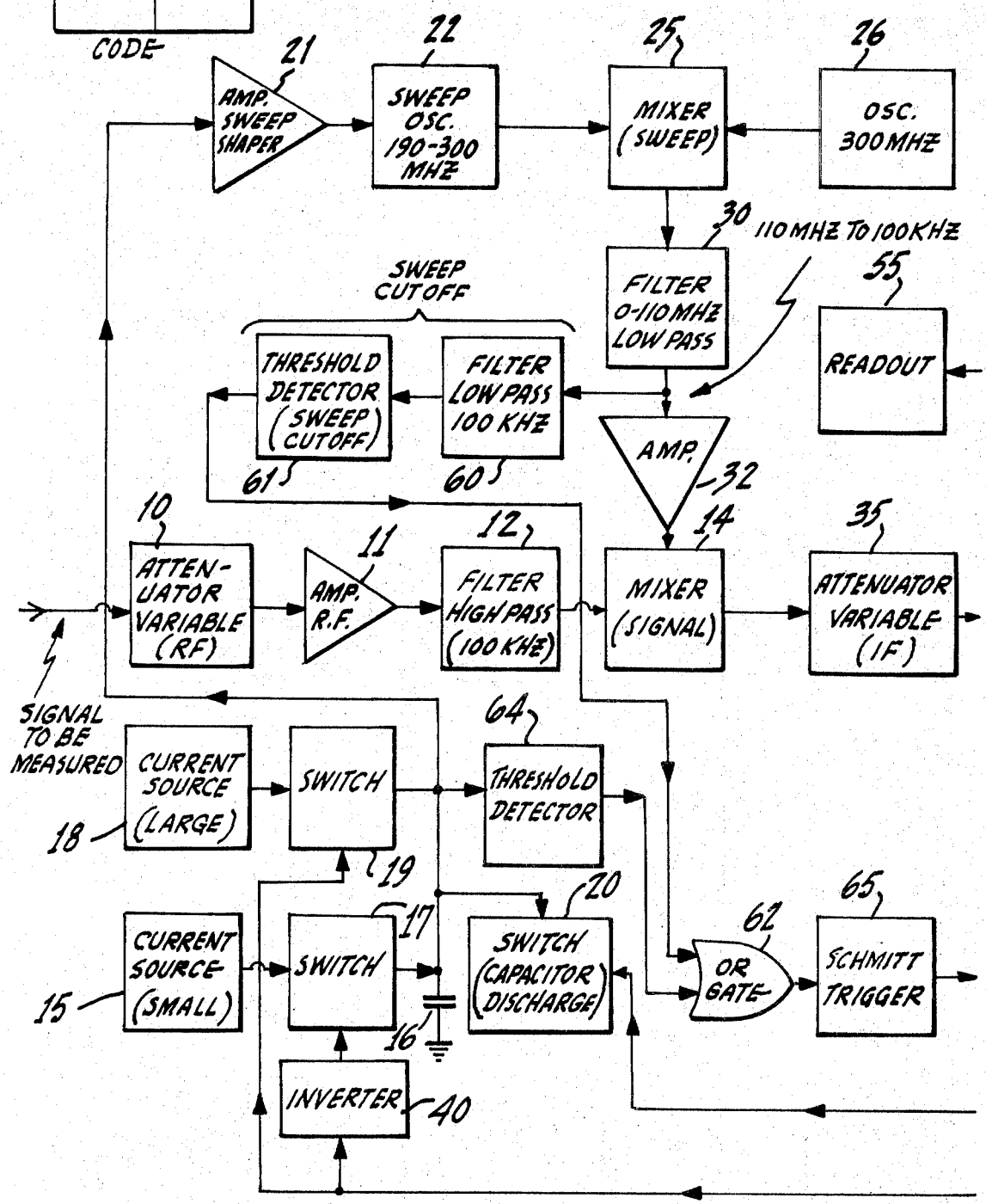
FIGS. 1a and 1b are detailed block diagrams of apparatus for measuring the amplitude of an AC signal according to this invention.
Figure 1B:
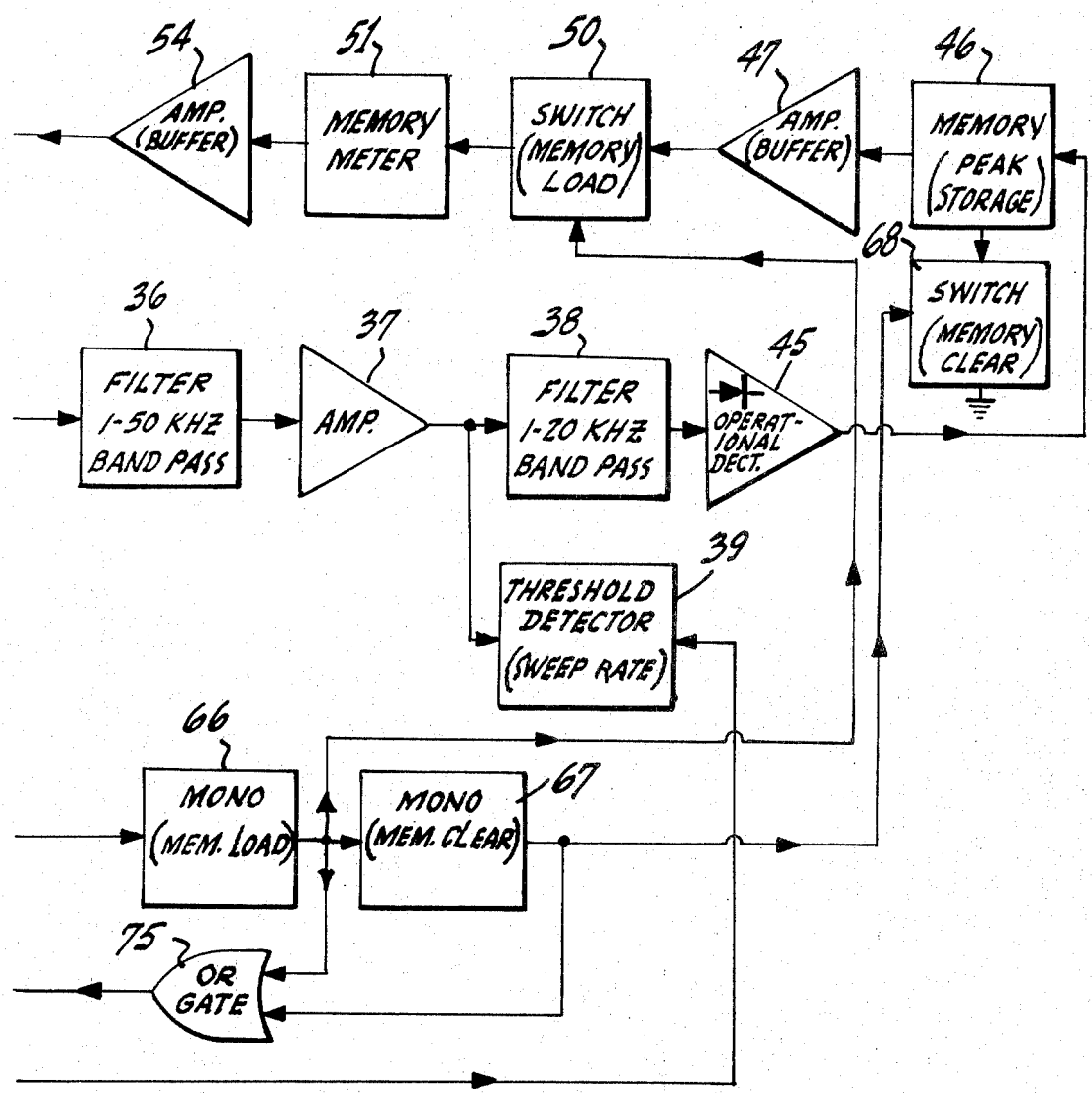

Referring to FIG. 1 there is shown a block diagram of a voltmeter according to this invention. There are various frequencies indicated on the diagram, which are useful in explaining operation, but which can, of course, vary without departing from the inventive concepts to be described herein.

A signal to be measured, which may be a relatively high frequency AC signal, in the range, for example, from 100 KHZ to 110 MHZ is applied to an input terminal of a variable radio frequency (RF) attenuator 10. The attenuator 10 is a stepped attenuator, wherein the input signal is selectively attenuated according to fixed decibel or other level. Such attenuators 10 can be manually operated or can be made to vary automatically by means of switching diodes and according to signal strength.

The output of the attenuator 10 is coupled to the input of a radio frequency (RF) amplifier 11. The amplifier 11 provides isolation and may further serve to provide a current or voltage gain of a fixed magnitude to the RF signal available at the output of the attenuator 10.

The output of the amplifier 11 is coupled to a high pass filter 12. The function of the high pass filter 12 is to prevent spurious signals from being applied to a signal mixer 14, and thence being applied to the intermediate frequency circuits or following bandpass filters.

The above description therefore specifies the signal path for the input signal, which is that signal whose amplitude is to be measured. The signal as processed is applied to a first input of the mixer 14. This mixer or down-convertor 14 may be of the balanced type and therefore only providing an output when signals are applied to both input terminals.

The other terminal of the mixer 14 has a reference signal applied thereto, which signal is generated by a swept oscillator circuit output combined with a fixed frequency oscillator signal as follows:

A sweep circuit includes a constant current source 15, capable of providing a constant, relatively low magnitude current for charging a capacitor 16 via a switching circuit 17 during a second operating mode. A second constant current source 18 is also capable of charging capacitor 16 during a first operating mode, which will be described subsequently. This constant current source 18 is applied to the capacitor 16 via a selectively operated switch 19. The capacitor 16 is discharged via a discharge switch circuit 20 under the control of additional logic circuitry to be described.

The sweep or ramp waveform available across capacitor 16 is applied to an amplifier 21. The function of amplifier 21 is to provide isolation, while shaping the sweep waveform in order to compensate for any nonlinearity due to the capacitor charging waveform and so on. The output of the amplifier 21 is applied to a swept oscillator 22. Oscillator 22 may be of a conventional configuration capable of being frequency modulated by the sweep waveform. The oscillator 22 may include a variable reactance device, such as a variator diode, whose reactance varies according to a voltage applied thereto. In this manner the sweep waveform available at the output of the amplifier 21 varies the frequency of the oscillator 22 over a predetermined range. The frequency modulated oscillator signal is applied to one input of a sweep mixer circuit 25. The other input to the mixer circuit 25 is obtained via a fixed frequency oscillator 26.

The mixer circuit 25 may also be of the balanced type and will provide an output during the presence of the two input signals.

The output of the mixer circuit 25 is applied to a low pass filter circuit 30. The low pass filter 30 serves to select the lower product provided by the mixer 25 while discriminating against the high products and the signal available from oscillator 26 and the signal available from the swept oscillator 22. Thus filter 30 discriminates against these frequencies as well as unwanted mixing products. The output of the low pass filter 30 is applied to the other input of the mixer 14 via an isolation amplifier 32.

The output from mixer 14 is applied to an attenuator 35, which is a variable attenuator similar to the attenuator 10, but operative at a lower frequency. The output of the attenuator 35 is coupled to a bandpass filter 36. The bandpass filter 36 functions as an intermediate frequency (IF) stage and operates to select any one of a range of frequencies within a predetermined low frequency range. Thus when the difference in frequency between the input signal via amplifier 11 and the signal via amplifier 32 is within the bandpass of filter 36 an output signal is provided. This signal is applied to an isolation amplifier 37. The output from the amplifier 37 is coupled to the input of still another bandpass filter 38, having a narrower bandpass than filter 36, and to the input of a threshold detector or sweep rate detector 39. It is the sweep rate threshold detector 39, as will be explained, that controls the charging of the sweep capacitor 16 via switches 17 and 19. Hence the output of the threshold detector 39 is coupled to the switch 19 associated with current source 18; and to switch 17 associated with current source 15 via an inverter 40. The threshold detector 39 may be a differential amplifier configuration or another typical threshold detection circuit, many examples of which exist in the prior art.

The output of the bandpass filter 38 is coupled to the input of a detector circuit 45. The detector circuit 45 serves to convert the AC signal at its input to a DC signal at its output. Detector 45 may be an operational amplifier detector configuration, to provide good linearity, while because of the large open loop response, increased sensitivity.

The output of the operational detector circuit 45 is coupled to a peak memory storage circuit 46. The function of the storage circuit 46 is to store the DC output of the detector 45 representative of the peak amplitude AC applied to the detector 45. The memory 46 may be a field effect storage circuit, or a typical capacitor store transistor circuit. Many memory circuits for doing this are known in the art.

The output of the memory 46 is applied to a buffer amplifier 47. The buffer amplifier 47 has the output terminal coupled to the input of a memory load switch circuit 50. The output of the switch 50 is coupled to another memory circuit 51. The function of memory 51 is to supply a signal to a readout device 55 via amplifier 54. The readout device 55 may be a conventional d'Arsonval DC meter, that requires a current of the order of 0.1 to 1.0 ma to produce full-scale deflection, or may be a digital readout device. Many suitable meters are known and available.

Both memories 46 and 50 are controlled according to the status of the mixer circuits and the sweep signals by the following logic circuitry:

Coupled to the low pass filter 30 is another low pass filter 60 having a narrower bandpass than filter 30. The output of filter 60 is applied via a sweep cutoff threshold detector 61 to an input of an OR gate 62. Another input to OR gate 62 is supplied via another detector 64 having an input coupled to capacitor 16. The output of OR gate 62 is applied to the input of a schmitt trigger circuit 65. The output of the schmitt trigger 65 is applied to the memory load switch 50 via a monostable multivibrator 66 or one-shot 66. The output of the monostable 66 is applied to another monostable 67 which multivibrator controls the operation of the peak storage memory 46 via a memory clear switch 68.

The outputs of both monostables 66 and 67 are applied to respective inputs of an OR gate 75, whose output is used to control the sweep switch discharge circuit 20.

OPERATION OF THE VOLTMETER

Assume that the signal to be measured is of a frequency of 10,000,000 cycles per second or 10 MHZ. It is noted at the onset that the frequency is only typical as are the other frequency values to be described herein, and the unit can operate over a plurality of different frequency ranges by changing parameters herein, but by using the basic apparatus provided by this invention.

Initially the current source (LARGE) 18 is coupled to the capacitor 16 and causes a ramp to be developed thereacross. This ramp is applied to a control input of oscillator 22 whose frequency is swept upward from, in this example, 190 to 300 MHZ due to the application of the ramp to a variable reactance device. The filter 30 passes only the difference frequency or the lower frequency product which is in the range of 0 to 110 MHZ. The difference frequency being determined by the difference between the frequency of oscillator 22 and oscillator 26. This frequency is applied to mixer 14 via amplifier 32.

The sweep oscillator starts at the low frequency end of 190 MHZ and is being swept upward. If the sweep oscillator commences operation at 190 MHZ the output of mixer 30 will be 110 MHZ, as the frequency of oscillator 22 is raised, the mixer 30 provides an output which approach the frequency of 10 MHZ. Therefore, oscillator 22 is swept upward, while the output of mixer 25 goes down in frequency accordingly.

When the oscillator 22 is at a frequency of 289.950 MHZ the low product output of mixer 25 is 10.05 MHZ and is passed through filter 30 and applied to mixer 14. Therefore, the difference output from mixer 14 is 50,000 HZ. This signal is propogated via attenuator 35 and the bandpass filter 36. The signal at the output of amplifier 37 serves to activate the sweep rate threshold detector 39.

The activation of the sweep rate detector 39 inhibits the current source (LARGE) 18 from charging capacitor 16 and simultaneously enables current source 15 (SMALL) via switch 17 and inverter 40 to thereby charge capacitor 16 at a slower rate.

As the oscillator 22 continues to sweep upward at the lower rate the filter 38 will also begin to pass signals and these signals are detected by detector 45 and stored in the memory 46. Memory 46 stores the largest peak value occurring within the bandpass of filter 38. As oscillator 22 is swept from 289.95 towards 289.98 MHZ, the output of mixer 14 goes from 50 KHZ to 20 KHZ. This (20 KHZ) specifies a frequency within the bandpass of filter 38. As the frequency of oscillator 22 is raised at the slow rate the output signal of mixer 14 decreases in frequency until oscillator 22 is at 290 MHZ, indicating a zero frequency output of mixer 14. Before this frequency, however, (at 1,000 HZ) the bandpass filters 36 and 38 do not pass any further signals. The detector 39 is released causing the sweep rate to change back to the large current source control. As soon as the oscillator 22 frequency increases to 299.90 MHZ, the filter 60 and threshold detector 61 operate. The sweep cut-off detector 61 then activates the schmitt trigger 65 via the OR gate 62. Activation of the schmitt trigger 65 causes the monostable 66 to trigger. This triggering of the monostable 66 serves to rapidly discharge capacitor 16 via discharge circuit 20 and to further inhibit charging of the capacitor 16 during the duration of the pulse afforded by one shot 66. This therefore prevents the oscillator 22 from being swept. The one shot 66 also enables the memory load switch 50 thus transferring the information stored in peak memory 46 to the meter memory 51, to thereby provide a reading of the voltage detected due to the 10 MHZ input signal.

At the termination of the period provided by the monostable 66, the monostable 67 is triggered. This also inhibits charging of capacitor 16 through the action of OR gate 75, as above described, and further removes all information stored in memory 46 by activating the memory clear switch 68.

At the termination of the period provided by monostable 67, the sweep circuit is again enabled and another detection cycle, as above described, commences.

Thus at the end of the cycle the output detected via detector 45 is stored and is a linear function of the largest spectral component of the input signal. It is this component that is indicated and provided as a reading via the readout 55, which may be a digital or analog type device.

Certain protective features are also incorporated in this unit. If for example the sweep cutoff is not activated by filter 60 and threshold detector 61, the threshold detector 64 which is monitoring the sweep ramp will be activated.

The detector 64 serves to trigger the monostables 66 and 67 to therefore discharge the capacitor 16 and hence initiates the normal instrument operating mode. This condition may occur during turn on of power to the above described circuitry or during a large transient condition.

Referring to FIG. 2 there is shown a series of timing diagrams specifying the output waveforms during various operating modes of the above described apparatus.

FIG. 2A shows the dual slope ramp, or sweep developed across capacitor 16 of FIG. 1, during the operation of filter 36 and the sweep rate threshold detector 39 of FIG. 1.

The shape of the ramp during the interval ti is derived from charging capacitor 16 via the large current source. As soon as the threshold detector 39 is activated due to a passing of a low frequency component via filter 36, the slope is changed and remains the lower valve during the threshold detector 39 operation as shown in FIG. 2B. When the sweep cutoff circuits are activated, operation of the monostables 66 and 67 commences as are shown in FIGS. 2C and 2D respectively. It is noted that during the combined time of monostables 66 and 67 the ramp is inhibited and thus oscillator 22 is not swept. After monostable 67 ceases providing the fixed period duration the normal cycle commences.

I claim:

1. Apparatus for measuring the amplitude of an AC signal comprising:
 a. mixing circuit means having first and second inputs, said first input adapted to receive said AC signal, and said second input adapted to receive a signal of a given frequency for providing at an output of said mixing circuit means a signal indicative of the sum or difference frequency between said AC signal and said given frequency signal,
 b. a controllable variable frequency oscillator capable of providing a variable frequency output signal at an output terminal when a control voltage is applied to an a control input terminal thereof, said oscillator having said output coupled to said second input of said mixing circuit means,
 c. a selectable sweep circuit capable of operating in a first selected mode for providing a first sweep control voltage at a first rate indicative of said oscillator output signal and said AC signal being within a predetermined band of frequency differences, and operative in a second select mode to provide a second sweep control voltage at a second rate indicative of said oscillator output signal and said AC signal being within a narrower predetermined band of frequency difference signals, said selectable sweep circuit having an input terminal for selecting either one of said modes and an output terminal coupled to said control input terminal of said oscillator,
 d. control means coupled to said input terminal of said sweep circuit and responsive in frequency between said AC signal and said oscillator signal being within said narrower range for providing a control signal to operate said sweep circuit from said first mode to said second mode, and
 e. indicator means responsive to said frequency difference during the presence of said control signal for providing an indication of the magnitude of said difference signal and therefore of said AC signal.

2. The apparatus according to claim 1 wherein said indicator means responsive to said frequency difference signal comprises:
   a. a detector having an input terminal coupled to said mixer circuit means, said detector having an output terminal,
   b. a memory peak storage circuit having an input terminal coupled to the output of said detector to store an indication of the magnitude of said difference signal during the presence of said control signal.

3. The apparatus according to claim 1 wherein said selectable sweep circuit comprises:
   a. a first current source having a relatively large current value,
   b. a second current source of a relatively lower value,
   c. a capacitor,
   d. switching means selectively coupling said first and second current sources to said capacitor to cause said capacitor to be charged by a desired one of said selectable current sources, said capacitor coupled to said control terminal of said oscillator,
   e. means coupled to switching means and responsive to the difference in frequency between said AC signal and said oscillator signal to cause said capacitor to be charged by said second current source only during said predetermined narrower difference between said oscillator frequency and said AC signal.

4. The apparatus according to claim 1 further comprising:
   a. a first bandpass filter coupled to the output of said mixing circuit means and adapted to pass a predetermined band of frequencies representative of a desired frequency difference between said oscillator and said AC signal, said bandpass filter having an output terminal,
   b. a second bandpass filter having a narrower band response than said first, an input terminal of said second bandpass filter coupled to said output terminal of said first bandpass filter, said second bandpass filter having an output terminal,
   c. an operational detector having an input terminal coupled to said output terminal of said second bandpass filter to provide at an output of said detector a DC voltage indicative of the magnitude of the peak value of a signal propogating through said second bandpass filter.

5. Apparatus for measuring the amplitude of an AC signal, comprising:
   a. a selectable sweep circuit capable of operating in a first selected mode for providing a first sweep voltage waveform of a first slope and in a second mode for providing a second sweep voltage waveform at a lower slope, said sweep circuit having an output terminal for providing either of said sweep waveforms, and an input terminal for selecting one of said modes,
   b. a variable frequency oscillator having a control input terminal coupled to said output terminal of said sweep circuit and an output terminal for providing a variable frequency signal according to the slope of a sweep waveform applied to said control input terminal,
   c. combining circuit means responsive to said AC signal and said oscillator signal to provide at an output thereof a signal indicative to the difference therebetween,
   d. threshold means coupled to the output of said first combining means and responsive to said difference signal for providing at an output thereof a control signal when said difference is within a predetermined range,
   e. means coupling said output of said threshold means to said sweep circuit means for operating the same in said second mode, to thereby vary the frequency of said oscillator according to said second waveform of said lower slope,
   f. detector means coupled to said output of said combining means and responsive to said control signal for providing at an output thereof a signal of a value dependent upon the magnitude of said difference signal and therefore of said AC signal, and
   g. means coupled to said detector means for providing an indication of the magnitude of said difference signal.

6. The apparatus according to claim 5 further including:
   a. a relatively fixed frequency oscillator,
   b. second combining circuit means having an input coupled to said output terminal of said variable frequency oscillator and another input coupled to said relatively fixed frequency oscillator to provide at an output of said second combining means a second difference frequency signal indicative of the difference in frequency between said relatively fixed oscillator signal and said variable frequency oscillator signal, said output of said second combining means coupled to an input of said first combining means.

7. The apparatus according to claim 6 further comprising:
   a. a low pass filter coupled to the output of said second combining means and responsive to said second frequency difference signal to provide an output when said second frequency difference signal is within a predetermined range,
   b. reference detector means coupled to said low pass filter and responsive to said frequency difference signal to provide a sweep cut-off voltage during at an output thereof,
   c. inhibiting means responsive to said sweep cut-off voltage and coupled to said sweep circuit to disable the same during the presence of said second difference signal being within said predetermined range.

8. Apparatus for measuring the amplitude of an AC signal comprising:
   a. mixing circuit means having first and second inputs, said first input adapted to receive said AC signal,
   b. a variable oscillator, having a control input terminal adapted to receive a voltage to vary the frequency of said oscillator at an output terminal, said output terminal coupled to said second input of said mixing circuit to provide at the output of said mixing circuit a difference signal frequency indicative of the difference in frequency between said AC signal and said oscillator signal,
   c. filter means coupled to the output of said mixing circuit and operative to pass a predetermined relatively narrow band of said difference frequencies, d. means having an input terminal coupled to said filter means and responsive to said narrow band of frequency to provide a control voltage,
e. control means coupling said oscillator control input terminal to said means to decrease the rate at which the frequency of the oscillator is varied during the presence of a frequency within said narrow band, and
f. indicator means responsive to said difference signal and coupled to said control means to provide at an output a signal level indicative of the magnitude of said frequency difference signal during said decreased rate of said oscillator.

* * * * *